United States Patent
Elong et al.

(10) Patent No.: US 10,094,369 B2
(45) Date of Patent: Oct. 9, 2018

(54) PROCESS FOR TRANSFERRING A LIQUID USING A PUMP

(75) Inventors: Paul Elong, Brussels (BE); Mircea Mateica, Timisoara (RO)

(73) Assignee: Plastic Omnium Advanced Innovation and Research, Brussels (BE)

(*) Notice: Subject to any disclaimer, the term of this patent is extended or adjusted under 35 U.S.C. 154(b) by 379 days.

(21) Appl. No.: 13/643,806

(22) PCT Filed: Apr. 28, 2011

(86) PCT No.: PCT/EP2011/056775
§ 371 (c)(1),
(2), (4) Date: Jan. 4, 2013

(87) PCT Pub. No.: WO2011/135043
PCT Pub. Date: Nov. 3, 2011

(65) Prior Publication Data
US 2013/0098460 A1    Apr. 25, 2013

(30) Foreign Application Priority Data
Apr. 30, 2010  (EP) .................................... 10161553

(51) Int. Cl.
*F17D 1/00*   (2006.01)
*F04B 49/025*   (2006.01)
(Continued)

(52) U.S. Cl.
CPC ............ *F04B 49/025* (2013.01); *F01N 3/208* (2013.01); *F04B 49/02* (2013.01); *F17D 1/00* (2013.01);
(Continued)

(58) Field of Classification Search
CPC ........ F04B 41/02; F04B 49/06; F04B 49/065; F04B 49/02; F04B 49/04; F04B 49/025;
(Continued)

(56) References Cited

U.S. PATENT DOCUMENTS

| 3,200,645 | A  | * | 8/1965 | Levins ............................ | 73/313 |
| 8,615,986 | B2 | * | 12/2013 | Gouriet et al. .................. | 60/286 |
| 2003/0056824 | A1 | * | 3/2003 | Harvey ......................... | 137/265 |
| 2003/0182935 | A1 | * | 10/2003 | Kawai et al. ................... | 60/286 |

(Continued)

FOREIGN PATENT DOCUMENTS

DE   10 2008 034 213   1/2010
DE   10 2008 034 223   1/2010
(Continued)

OTHER PUBLICATIONS

International Search Report dated Jun. 8, 2011 in PCT/EP11/56775 Filed Apr. 28, 2011.

*Primary Examiner* — Essama Omgba
*Assistant Examiner* — Stephen Mick
(74) *Attorney, Agent, or Firm* — Oblon, McClelland, Maier & Neustadt, L.L.P.

(57) ABSTRACT

A process to pump liquid held in a passive tank to an active tank when the active tank has a liquid level below a set point level and when the passive tank contains liquid at a temperature above the freezing point of the liquid, the active tank including a discontinuous level gauge configured to provide at least x+1 indications of the level of liquid in tank as a function of the relative position of a moving part with respect to x set point levels, x being at least equal to 2. The process includes: reading the level indication from a level gauge; starting a pump and measuring a time during which a pump transfers liquid; stopping the pump if this time is greater than a time constant, which depends on the value of the level indication, and if a next set point level is not reached.

8 Claims, 1 Drawing Sheet

(51) Int. Cl.
*F04B 49/02* (2006.01)
*F01N 3/20* (2006.01)

(52) U.S. Cl.
CPC ............... *F01N 2610/144* (2013.01); *F01N 2610/1406* (2013.01); *F04B 2205/10* (2013.01); *F04B 2205/11* (2013.01); *F04B 2207/03* (2013.01); *Y02T 10/24* (2013.01); *Y10T 137/0324* (2015.04)

(58) Field of Classification Search
CPC .............. F04B 2205/10; F04B 2205/11; F04B 2207/03; F04B 2207/043; F01N 3/208
USPC ...... 417/53, 12, 14, 18, 32, 36, 38, 44.2, 63
See application file for complete search history.

(56) References Cited

U.S. PATENT DOCUMENTS

| | | | |
|---|---|---|---|
| 2008/0264041 A1* | 10/2008 | Gerlach | 60/286 |
| 2009/0084095 A1* | 4/2009 | Dalton | 60/301 |
| 2009/0213515 A1* | 8/2009 | Phillips et al. | 361/93.2 |
| 2010/0086446 A1* | 4/2010 | Matsunaga et al. | 422/106 |
| 2011/0094594 A1 | 4/2011 | Baumeister | |
| 2011/0110792 A1* | 5/2011 | Mauro | F04B 49/02 417/44.1 |
| 2011/0255992 A1* | 10/2011 | Tran et al. | 417/1 |

FOREIGN PATENT DOCUMENTS

| | | |
|---|---|---|
| EP | 0 928 884 | 7/1999 |
| FR | 2 918 111 | 1/1990 |
| WO | 2009 090101 | 7/2009 |

* cited by examiner

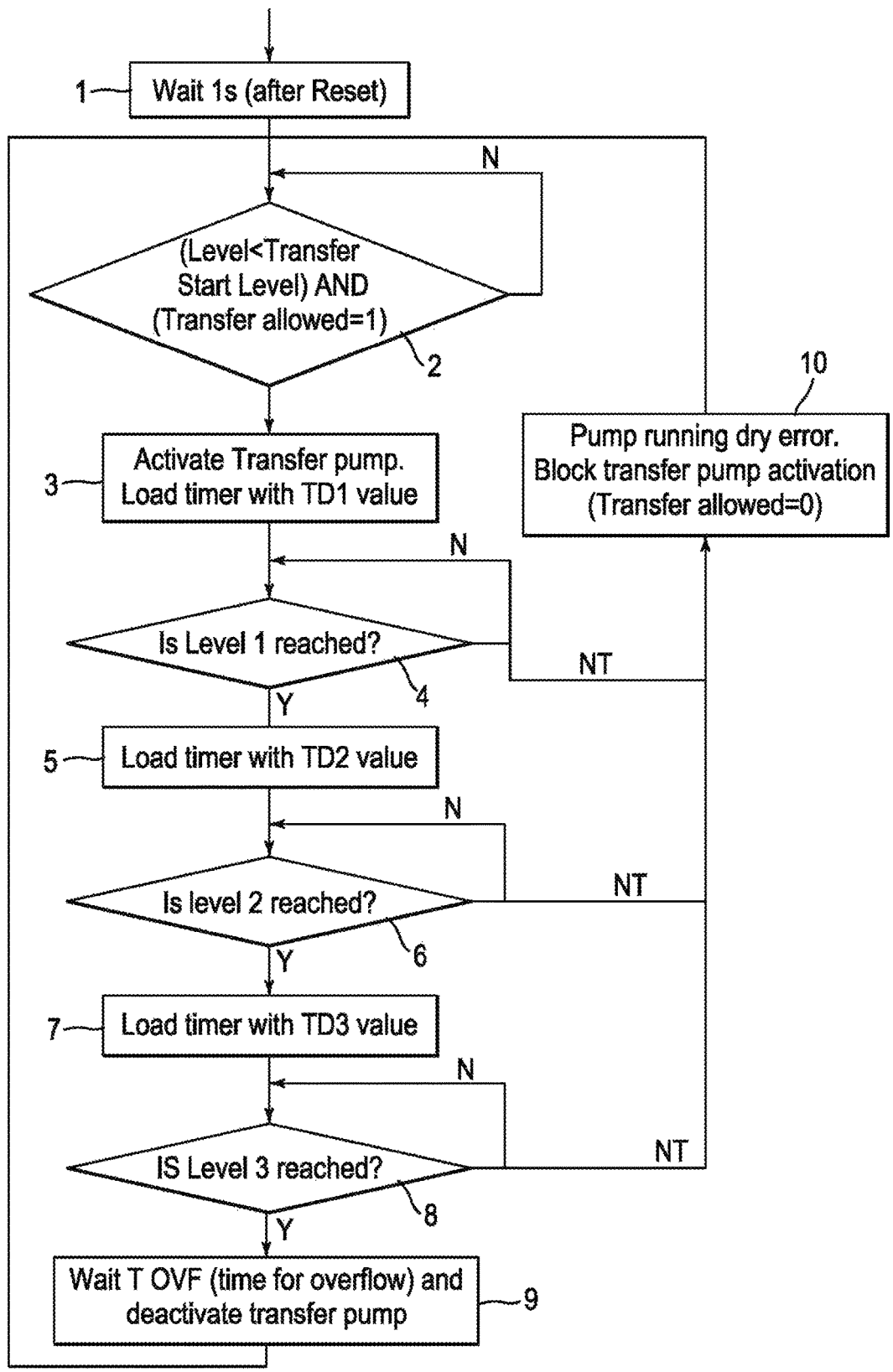

PROCESS FOR TRANSFERRING A LIQUID USING A PUMP

The present application relates to a process for transferring a liquid from a $1^{st}$ tank to a $2^{nd}$ tank using a pump. It relates, in particular, to a process for transferring aqueous solutions of urea or of another ammonia precursor susceptible of freezing at ambient temperatures depending on the local weather conditions.

The system used by most vehicle (trucks, cars) manufacturers for reducing $NO_x$ emissions below the value required by environmental regulations generally consists in carrying out a selective catalytic reaction with reducing agents such as urea ("Urea SCR" or selective catalytic reduction using ammonia generated in situ in the exhaust gases by decomposition of urea).

In order to do this, it is necessary to equip the vehicles with a tank containing a urea solution and also with a device for metering the amount of urea to be injected into the exhaust line. Given that the aqueous urea solution generally used for this purpose (eutectic 32.5 wt % urea/water solution) freezes at minus 11° C., it is necessary to provide a heating device to liquefy the solution in order to be able to inject it into the exhaust line in the event of starting in freezing conditions.

For the purpose of increasing the autonomy of the vehicles, and considering the encumbrance/structure of the vehicles, it is sometimes desired to have at least two tanks for storing the urea solution. For the purpose of preventing the problems of freezing, of limiting the costs of the system and also the power consumed, it is moreover known to heat only one of the two tanks (the one from which urea is pumped and sent to the injection system, and which is often called the "active" tank). Such a heating is required because the car manufacturers generally require the anti-polluting system to be effective during at least a given amount of km and/or time if possible also during freezing conditions. Such a specification is or will become more and more applied because of the more and more severe environmental standards. Such a specification implies a minimum volume of liquid to be available considering the consumption of said liquid by the system.

Also for economical reasons, it is preferred to only have a temperature sensor and a level gauge in the active tank.

Such an architecture is for instance known from WO 2009/090101 to the Applicant, which describes a process for transferring a urea solution from a storage tank ("passive" tank (1)) to an active tank (2) (from where the solution is conveyed to the exhaust system of the engine) using a transfer pump that is commanded so as to transfer liquid from the passive tank (1) to the active tank (2) when said active tank (2) has a liquid level below a set point level Lsp and when the passive tank (1) contains liquid at a temperature above the freezing point of the liquid.

Such a process allows liquid to be withdrawn from the passive tank (1) only when it is required (i.e. only when the level in tank (2) is below a set point level), when the passive tank (1) is not empty and when the liquid that it contains is not frozen. According to a preferred embodiment, liquid is transferred from passive tank (1) to active tank (2) until a target level (Lt) is reached. This level generally is at least the full level of said tank, calculated based on its geometry and the car manufacturer specification. Since the physical "full level" is usually at 85% of the maximum volume, the pump is activated for a fixed time when reaching the full level. The set point and target levels are preferably significantly different so that the transfer pump is not continuously switched on and off.

In the process of WO '01, the time during which the pump transfers liquid is preferably measured and the pump is stopped if this time is greater than a time constant TD and the liquid level L has not reached the target level Lt. In this way, the pump is prevented from operating for too long when the tank (1) is empty since the pump may then operate when empty and risks being damaged. This situation can happen also when the pump is broken, which should be brought to the attention of the driver. However, the time required for completely filling the tank may be rather long so that the pump may still operate "empty" a time which is too long and be damaged.

The present invention is an improvement over that embodiment which allows reducing still further the time during which the transfer pump is running dry.

Accordingly, the present invention relates to a process for transferring a liquid from a passive tank (1) for storing the liquid to an active tank (2), using a pump intended for pumping the liquid held in the passive tank (1) and transferring it to the active tank (2), according to which the pump is commanded so as to transfer liquid from the passive tank (1) to the active tank (2) when said active tank (2) has a liquid level below a set point level Lsp and when the passive tank (1) contains liquid at a temperature above the freezing point of the liquid, the active tank (2) being equipped with a level gauge which is a discontinuous gauge which is able to provide at least x+1 indications of the level of liquid in tank (2) as a function of the relative position of a moving part with respect to x set point levels, x being at least equal to 2, characterized in that said process comprises the following steps:
  reading the level indication from the level gauge;
  starting the pump and measuring the time during which the pump transfers liquid;
  stopping the pump if this time is greater than a time constant (TDn), which depends on the value of the level indication L, and if the next set point level is not reached.

In some embodiments, depending generally on the car geometry, the active tank (2) may be located above the passive tank (1) so that the latter can be filled by overflow of the former. Such a geometry generally allows short filling times, which is advantageous especially since refilling operations generally take place during service/maintenance of the car.

In these embodiments, it is advantageous for the transfer pump to be able to overfill (i.e. to fill at a level where overflow will occur) the active tank (2) in order to take advantage of most of the active volume of said tank (especially when it is heated). In such embodiments, which will be described in detail later in the specification, the above mentioned target level may be an overflow level or even: the maximum overflow level i.e. the maximum level at which the active tank (2) can be filled considering its geometry i.e. namely: the location of the overflow passage in said tank.

In the process of the invention, the system starts by measuring the level inside the active tank (2). If this level is not below the set point level Lsp, the transfer pump is not activated and the SCR system starts using the liquid present in the active tank (2). If the level in the active tank (2) is below the set point level Lsp, then the SCR system checks if the transfer conditions are met (i.e. if tank (1) contains liquid at a temperature above the freezing point of said liquid) before activating the transfer pump.

According to the invention, tank (1) is preferably not equipped with a temperature probe whereas tank (2) is equipped with a temperature probe. To obtain a value of the temperature in tank (1), the temperature Text outside the two tanks (1) and (2) is measured using a temperature probe, which temperature Text is taken as an estimation of the temperature in tank (1).

According to the invention, the level sensor in tank (2) provides an indication of the level L in tank (2) in a discrete manner. The sensor may be, for example, of the float type and provides three indications of the level L as a function of the relative position of the float with respect to two set point levels L1 and L2, where L1<L2. In this case, when the level L is greater than or equal to L2 the sensor indicates a "high level" (or a value of 2 for instance), when the level L is less than L2 and greater than or equal to L1 the sensor indicates an "intermediate level" (or a value of 1 for instance) and when the level L is less than L1, the sensor indicates a "low level" (or a value of 0 for instance). For such a gauge (with 2 set point levels), the respective values of Lsp and Lt and different pump controlling strategies associated therewith, can be found in WO'01 mentioned above, the content of which is incorporated by reference in the present specification.

The above reasoning can of course be generalized to a gauge having more set point levels. Namely, in practice, a gauge having at least three and preferably at least five set point levels (or x being at least equal to 3 or to 5) gives good results, gauges with more than 8 set point levels giving even better results.

According to a preferred embodiment, when x is at least equal to 3, Lsp is at least equal to L2/3x so that the transfer pump is started when the level read by the gauge is below about two third of the maximum set point level. Hence, in an embodiment where the gauge has 6 set point levels, a strategy where Lsp equals L4 (or in other words: where transfer is initiated when the level read by the gauge is below 4) gives good results.

Generally, since the liquid in tank (2) is subjected to a wave movement, also known as "slosh", the level indication of the gauge may fluctuate between several values. Hence, according to a preferred embodiment of the invention, the level indication from the gauge is filtered so as to suppress these fluctuations and give a constant value. A $1^{st}$ order low-pass filter with a larger time constant (e.g 15s) is used for this purpose.

According to the invention, for each set point level, a time constant (TDn) is computed, which is generally the time for passing from level n to level n+1 (with 0<=n<=x) considering the pump flow rate (which is generally constant) and the volume of liquid between 2 adjacent set points for n>0, and between the empty state and the first set point when n=0. According to a preferred embodiment, a safety margin is added to the actual time for passing the next level before concluding that the pump runs dry or is blocked, for covering worst case scenarios (e.g. level difference with different slopes, flow rate tolerances).

The present invention may be applied to tanks storing a liquid to be injected in the exhaust gases of an internal combustion engine. It is advantageously applied to diesel engines, and in particular to the diesel engines of trucks.

The process of the invention generally uses a microcontroller which controls the transfer pump and in which the values of TDn are stored. Each time the engine starts after having been turned off, this microcontroller generally resets the values from the sensors to a default value. Preferably, after a reset, the transfer pump is blocked for a given period of time (1s for instance) in order for the level gauge to be able to perform the actual reading of the liquid level so that a transfer is not initiated when it is not required (what would be the case if the default value is zero for instance).

According to a preferred sub-embodiment of the present invention, the microcontroller stores the number of times the pump has run dry (RD) and when this number reaches a given value (which may be 1 for transfer pumps which are very sensitive to running dry), it blocks the transfer pump until a refill event is detected; he then unlocks the transfer pump by putting the number RD at zero. Generally, the refill event is detected based on the signal of the level gauge. Therefore, this embodiment also requires the transfer function to be blocked during a given period of time after reset.

As explained previously, the liquid for which the invention is intended is a liquid capable of freezing or solidifying (getting solid) when the temperature reaches a low temperature threshold. These may, for example, be aqueous solutions. One liquid to which the present invention applies particularly well is urea or another reducing agent that can be used in the SCR system of an engine.

The term "urea" is understood to mean any, generally aqueous, solution containing urea. The invention gives good results with eutectic water/urea solutions for which there is a quality standard: for example, according to the standard DIN 70070, in the case of the AdBlue® solution (commercial solution of urea), the urea content is between 31.8% and 33.2% (by weight) (i.e. 32.5 +/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. onwards (as opposed to −11° C.), but have the disadvantages of corrosion problems linked to the possible release of formic acid and a less available market (whereas urea is widely used and readily available even in fields such as agriculture). The present invention is particularly advantageous in the context of eutectic water/urea solutions.

According to a preferred embodiment of the invention, tank (1) is not equipped with a heating element, or with a temperature probe or a level gauge. This embodiment is economically very attractive since only tank (2) has to be equipped with such elements.

The present invention is illustrated in a non limitative way by the block diagram attached as FIG. 1, which lists and links the steps of a method according to a preferred embodiment of the invention, using a gauge with 3 set point levels, the lowest one being the one below which the transfer pump is activated.

In this diagram, the following letters and digits have the following meaning:

Y—yes
N—no
NT—no and timeout expired
1—Wait 1s (after Reset)
2—(Level<Transfer Start Level) AND (Transfer allowed=1)
3—Activate transfer pump. Load timer with TD1 value
4—Is Level 1 reached?
5—Load timer with TD2 value
6—Is Level 2 reached?
7—Load timer with TD3 value
8—Is Level 3 reached?
9—Wait T OVF (time for overflow) and deactivate transfer pump 10—Pump running dry error. Block transfer pump activation (Transfer allowed=0)

The invention claimed is:

1. A process for transferring a liquid from a passive tank for storing the liquid to an active tank, using a transfer pump configured to pump the liquid held in the passive tank and transferring the liquid to the active tank, the method comprising:
commanding the transfer pump to transfer liquid from the passive tank to the active tank when the active tank has a liquid level below a set point level Lsp and when the passive tank contains liquid at a temperature above the freezing point of the liquid, the active tank including a level gauge which is a discontinuous gauge configured to provide at least x+1 level indications of the level of liquid in the active tank as a function of the relative position of a moving part with respect to x set point levels, x being at least equal to 3, x being a positive integer, by:
reading a level indication L among the level indications from the level gauge, selecting a time constant from time constants stored in a microcontroller on a basis of the level indication L that has been read and loading the selected time constant which depends on a value of the level indication L;
starting the transfer pump and measuring a time during which the pump transfers liquid; and
stopping the transfer pump when this time is greater than the time constant, and when a next set point level is not reached,
wherein the time constant is computed based on a time for passing from level n to level n+1 (with $0<=n<=x$, and n being 0 or a positive integer) considering a pump flow rate, which is generally constant, and the volume of liquid between two adjacent set points when n is >0, and between an empty state and the first set point when n =0,
wherein:
the tanks store a liquid to be injected in exhaust gases of an internal combustion engine;
the time constants are stored in the microcontroller that controls the transfer pump;
each time the engine starts after having been turned off, the microcontroller resets values from the sensors to a default value; and
after a reset, the transfer pump is blocked for a given period of time, and
wherein the microcontroller stores a number of times the pump has run dry and when this number reaches a given value, the microcontroller blocks the transfer pump until a refill event is detected; and then unlocks the transfer function by putting the number at zero.

2. The process according to claim 1, wherein:
the active tank is located above the passive tank so that the passive tank can be filled by overflow of the active tank;
when the transfer pump is started, liquid is transferred from the passive tank to the active tank until a target level is reached, which is a maximum overflow level of a maximum level at which the active tank can be filled considering its geometry.

3. The process according to claim 1, wherein the passive tank does not include a temperature probe whereas the active tank does include a temperature probe, and wherein a temperature outside the two tanks is measured using the temperature probe, which temperature is taken as an estimation of a temperature in the passive tank.

4. The process according to claim 1, wherein the set point level Lsp is at least equal to L2/3x so that the transfer pump is started when the level read by the gauge is below about two-thirds of a maximum set point level.

5. The process according to claim 1, wherein the level indication from the gauge is filtered so as to suppress fluctuations and give a constant value.

6. The process according to 1, wherein a safety margin is added to an actual time for passing a next level when computing the time constant.

7. The process according to claim 1, wherein the liquid is an aqueous urea solution.

8. A process for transferring a liquid from a passive tank for storing the liquid to an active tank, using a transfer pump configured to pump the liquid held in the passive tank and transferring the liquid to the active tank, the method comprising:
commanding the transfer pump to transfer liquid from the passive tank to the active tank when the active tank has a liquid level below a set point level Lsp and when the passive tank contains liquid at a temperature above the freezing point of the liquid, the active tank including a level gauge which is a discontinuous gauge configured to provide at least 9 level indications of the level of liquid in the active tank as a function of the relative position of a moving part with respect to 8 set point levels, by:
reading a level indication L among the level indications from the level gauge, selecting a time constant from time constants stored in a microcontroller on a basis of the level indication L that has been read and loading the selected time constant which depends on a value of the level indication L;
starting the transfer pump and measuring a time during which the pump transfers liquid; and
stopping the transfer pump when this time is greater than the time constant, and when a next set point level is not reached,
wherein the time constant is computed based on a time for passing from level n to level n+1 (with $0<=n<=x$, and n being 0 or a positive integer) considering a pump flow rate, which is generally constant, and the volume of liquid between two adjacent set points when n is >0, and between an empty state and the first set point when n =0,
wherein:
the tanks store a liquid to be injected in exhaust gases of an internal combustion engine;
the time constants are stored in the microcontroller that controls the transfer pump;
each time the engine starts after having been turned off, the microcontroller resets values from the sensors to a default value; and
after a reset, the transfer pump is blocked for a given period of time, and
wherein the microcontroller stores a number of times the pump has run dry and when this number reaches a given value, the microcontroller blocks the transfer pump until a refill event is detected; and then unlocks the transfer function by putting the number at zero.

* * * * *